W. J. STEVENS.
EXPANDING SCREW TAP.
No. 38,512.   Patented May 12, 1863.
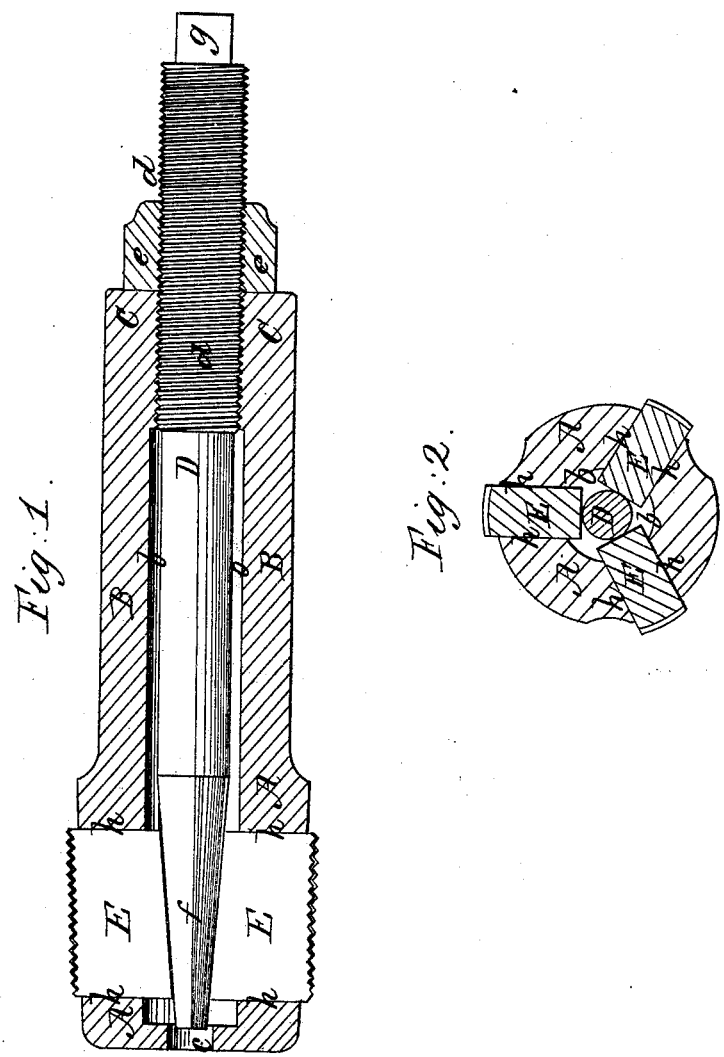

UNITED STATES PATENT OFFICE.

WILLIAM J. STEVENS, OF JERSEY CITY, NEW JERSEY.

IMPROVEMENT IN EXPANDING SCREW-TAPS.

Specification forming part of Letters Patent No. 38,512, dated May 12, 1863.

*To all whom it may concern:*

Be it known that I, WILLIAM J. STEVENS, of Jersey City, in the county of Hudson and State of New Jersey, have invented a new and useful Improvement in Expanding Screw-Taps; and I do hereby declare that the following is a full, clear, and exact description of the same, reference being had to the accompanying drawings, forming part of this specification, in which—

Figure 1 is a central longitudinal section of a tap constructed according to my invention. Fig. 2 is a transverse section of the same.

Similar letters of reference indicate corresponding parts in both figures.

The object of my invention is to provide in a simpler manner than in the expanding taps heretofore constructed for the setting out and adjustment of the cutters; and to this end it consists in a novel mode of combining a cone and adjusting-screw with each other and with the body and head of the tap and the cutters.

To enable others skilled in the art to make and use my invention, I will proceed to describe its construction and operation.

A is the body, B the neck, and C the head, of the tap, made of a single piece of steel, and bored throughout, the neck and body being bored larger than the head, as shown at $b$ $b$, nearly to the bottom, where the bore is reduced, as shown at $c$. Within the head the bore has cut in it a female screw-thread, for the reception of a male screw-thread, $d$, on the exterior of the central spindle, D. This spindle is made of a length greater than the combined length of the body, neck, and head, in order that it may extend through the neck, the greater portion of the body, and the head, and protrude some distance from the head, outside of which its screw-thread $d$ is fitted with a set-nut, $e$. The portion $f$ of the said spindle within the body $a$ is made of conical form to its lower or inner extremity, and the outer or upper end of the said spindle is made with a square head, $g$, for the reception of a wrench by which to turn it.

The body A has cut through it a number of longitudinal parallel-sided mortises, $h\ h$, corresponding with the number of cutters to be employed, each one receiving one of the cutters, E E, which are fitted so snugly thereinto that, while they are permitted to work in and out to permit their adjustment, they cannot drop or be shaken or knocked out accidentally. The inner edges or faces of these cutters are tapered longitudinally in a reverse direction to the cone $f$, to conform to the profile of the latter, and the outer faces are threaded in a suitable manner. They are inserted in the mortises from the outside of the body.

When the nut is turned back upon the screw-thread D, away from the head C of the tap, the spindle is free to be turned by the application of a wrench to its head. By turning the spindle in a direction to screw it into the tap, the cone $f$ acts upon the cutters E E in such manner as to force them outward through the body, and by turning it in the reverse direction the cone is drawn back from the cutters, so as to permit them to be forced inward by pressure applied to their outer faces, and thus the cutters can be adjusted to the proper distance from the axis of the body to give the tap the required effective diameter. The adjustment is secured by screwing the nut $e$ tightly against the head C. The cutters, when their edges are blunted by wear, can be taken out and have their threads recut, and afterward be reinserted and adjusted to make the tap of the same effective size as before.

The tap thus constructed, with the body, neck, and head of one piece, and the adjusting cone and screw of another piece, is much simpler than the expanding taps heretofore constructed, being composed of but three pieces besides the cutters. If the screw-thread $d$ were fitted tightly enough into the screw-thread in the head of the tap, the nut $e$ might be dispensed with, making but two pieces besides the cutters. This simple construction of the tap makes it cheaper, more easily adjusted, and less liable to get out of order.

I do not claim, broadly, the construction of a tap with movable cutters adjusted by means of a cone and screw; but I do claim as my invention and desire to secure by Letters Patent, as an improved article of manufacture—

An expanding screw-tap made with a hollow body, A, and mortises $h$, nut-cutters E, conical screw-spindle D, the nut $e$, and screw-head C, all as herein shown and described.

W. J. STEVENS.

Witnesses:
M. M. LIVINGSTON,
CHAS. A. FISKE.